(12) United States Patent
Simpson et al.

(10) Patent No.: US 7,184,176 B2
(45) Date of Patent: Feb. 27, 2007

(54) METHODS AND SYSTEMS FOR BLACK AND WHITE CONVERSION OF IMAGING DATA

(75) Inventors: Shell S. Simpson, Boise, ID (US); Ward S. Foster, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1019 days.

(21) Appl. No.: 09/953,760

(22) Filed: Sep. 17, 2001

(65) Prior Publication Data

US 2003/0053135 A1    Mar. 20, 2003

(51) Int. Cl.
*G06F 15/00* (2006.01)
(52) U.S. Cl. .................. 358/2.1; 358/1.15; 358/1.18
(58) Field of Classification Search .............. 358/1.15, 358/1.9, 2.1, 1.18, 400, 401, 406; 382/163
See application file for complete search history.

(56) References Cited

U.S. PATENT DOCUMENTS

2003/0053135 A1* 3/2003 Simpson et al. ............. 358/2.1

FOREIGN PATENT DOCUMENTS

JP          20030244452     *   8/2003

* cited by examiner

*Primary Examiner*—Jerome Grant, II (57) ABSTRACT

Methods and systems for converting imaging data so that grayscale representations are eliminated are described. In accordance with one embodiment, imaging data is represented in a print format. The print format is a format that can be understood and used by a printer that is to print the imaging data. The print format is processed in a manner such that any representations within the print format that would result in a grayscale other than pure black or pure white being printed are modified. Modification of the print format can ensure that only black or white appear on a printed page, without any grayscale values therebetween. In one embodiment, a document conversion service for converting grayscale to either pure black or pure white is provided in a network environment and can be accessed and utilized by users via a network such as the Internet.

22 Claims, 8 Drawing Sheets

METHODS AND SYSTEMS FOR BLACK AND WHITE CONVERSION OF IMAGING DATA

TECHNICAL FIELD

This invention relates to printing and distributed environments, and more particularly concerns methods and systems for black and white conversion of imaging data.

BACKGROUND

As computer technology has advanced, the role of computers in our daily lives has expanded, as has the need for various peripheral or supporting devices. One typical peripheral device used with computers is a printer, which generates a hard copy of data that is used by the computer. The types and capabilities of printers available has similarly been expanding, resulting in a wide variety of printers with a range of printing capabilities, performance, and price.

One problem that has emerged in recent times concerns printing documents that have grayscale portions, i.e. portions that are neither pure black nor pure white. Specifically, many times grayscale (and color) does not print at a sufficient or desired resolution. In addition, individuals will sometimes desire for their printed document to be printed only in pure black and pure white with no grayscale or color. Yet, if the document contains gray, shaded areas, or color areas, it will inevitably result in a rendered document with grayscale portions. As a result, the user is left with a less than desirable printed version of their document. In these instances, it would be more desirable to print documents in black and white, without any color or grayscale representations.

Against this backdrop, one significant expansion in the use of computer technology is the networking of computers together. Networking computers together allows the computers to communicate with one another as well as with other devices, such as printers. As computer networks, such as the Internet, continue to develop, there is an increasing demand for additional and improved functionalities that draw upon and exploit the full computing potential of computer networks.

Accordingly, this invention arose out of concerns associated with providing methods and systems for converting imaging data such that printed versions of the imaging data have only black and while portions and no grayscale representations.

SUMMARY

Methods and systems for converting imaging data so that grayscale or color representations are eliminated are described. In accordance with one embodiment, imaging data is processed such that any data within the imaging data that would result in a printed grayscale or color other than pure black or pure white is modified. In one implementation, the imaging data is represented in a print format. The print format is a format that can be understood and used by a printer that is to print the imaging data. The print format is processed in a manner such that any representations within the print format that would result in a grayscale or color other than pure black or pure white being printed are modified. Modification of the print format can ensure that only black or white appear on a printed page, without any grayscale or color values therebetween.

In one embodiment, a network-based or Web-based document conversion service for converting grayscale or color to either pure black or pure white is provided in a network environment.

DETAILED DESCRIPTION

Overview

Methods and systems for converting imaging data so that grayscale or color representations are eliminated are described. In accordance with one embodiment, imaging data is processed such that any data within the imaging data that would result in a printed grayscale or color other than pure black or pure white is modified. In one implementation, the imaging data is represented in a print format. The print format is a format that can be understood and used by a printer that is to print the imaging data. The print format is processed in a manner such that any representations within the print format that would result in a grayscale or color other than pure black or pure white being printed are modified. Modification of the print format can ensure that only black or white appear on a printed page, without any grayscale or color values therebetween. One advantage of various described embodiments is the ability to preview the document. Conversion from grayscale/color to black and white can be problematic and it can be advantageous to ensure that output is as expected to avoid waste.

In one embodiment, a document conversion service for converting grayscale or color to either pure black or pure white is provided in a network environment and can be accessed and utilized by users via a network such as the Internet.

Exemplary Distributed System

Figure 1:
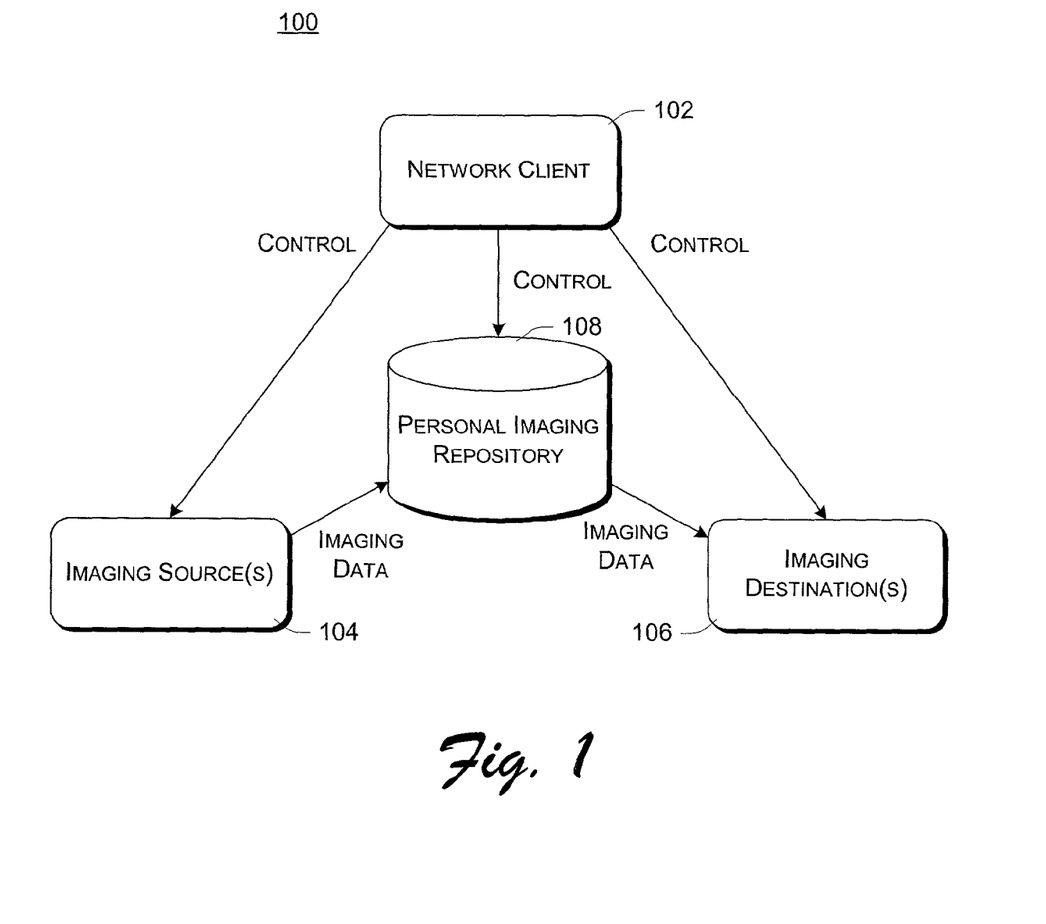
FIG. 1 illustrates an exemplary distributed system in which pre-defined print option configurations can be used.

FIG. 1 illustrates an exemplary distributed system 100 in which various embodiments described below can be implemented. In system 100, a network client device 102 is in communication with one or more imaging sources 104, one or more imaging destinations 106, and a personal imaging repository 108. A user of client device 102 can communicate with imaging source(s) 104 to select or identify images to be stored in personal imaging repository 108. Imaging sources 104 represent any of a wide variety of devices that are capable of providing images to other devices. Examples of imaging sources 104 can include computers, cameras (e.g., digital still or video cameras), scanners, applications, Web sites, and so forth.

Repository 108 represents image storage facilities personalized to the individual user, although alternatively multiple users may have access to the same repository 108. Repository 108 is maintained on one or more computers, such as network client 102, an imaging source(s) 104, an imaging destination(s) 106, another computer (not shown), or combinations thereof. The imaging data in repository 108 can be any type of printable data, such as text, drawings, frames of video or animations, pictures, combinations thereof, and so forth.

The user, via network client 102, can select images from imaging repository 108 to be communicated to imaging destination(s) 106 for printing. In one aspect, the selected images from the repository can be communicated to the imaging destination in accordance with pre-defined print option configurations identified by the user, and as described in co-pending patent application Ser. No. 09/905,506, entitled "Pre-defined Print Option Configurations for Printing in a Distributed Environment", naming Shell Simpson, Ward Foster, and Kris Livingston as inventors, the disclosure of which is incorporated by reference.

Imaging destination 106 represents any of a wide variety of devices that are capable of processing images in some manner. Examples of imaging destinations 106 include printers, plotters, services managing printing devices, and so on.

Figure 2:
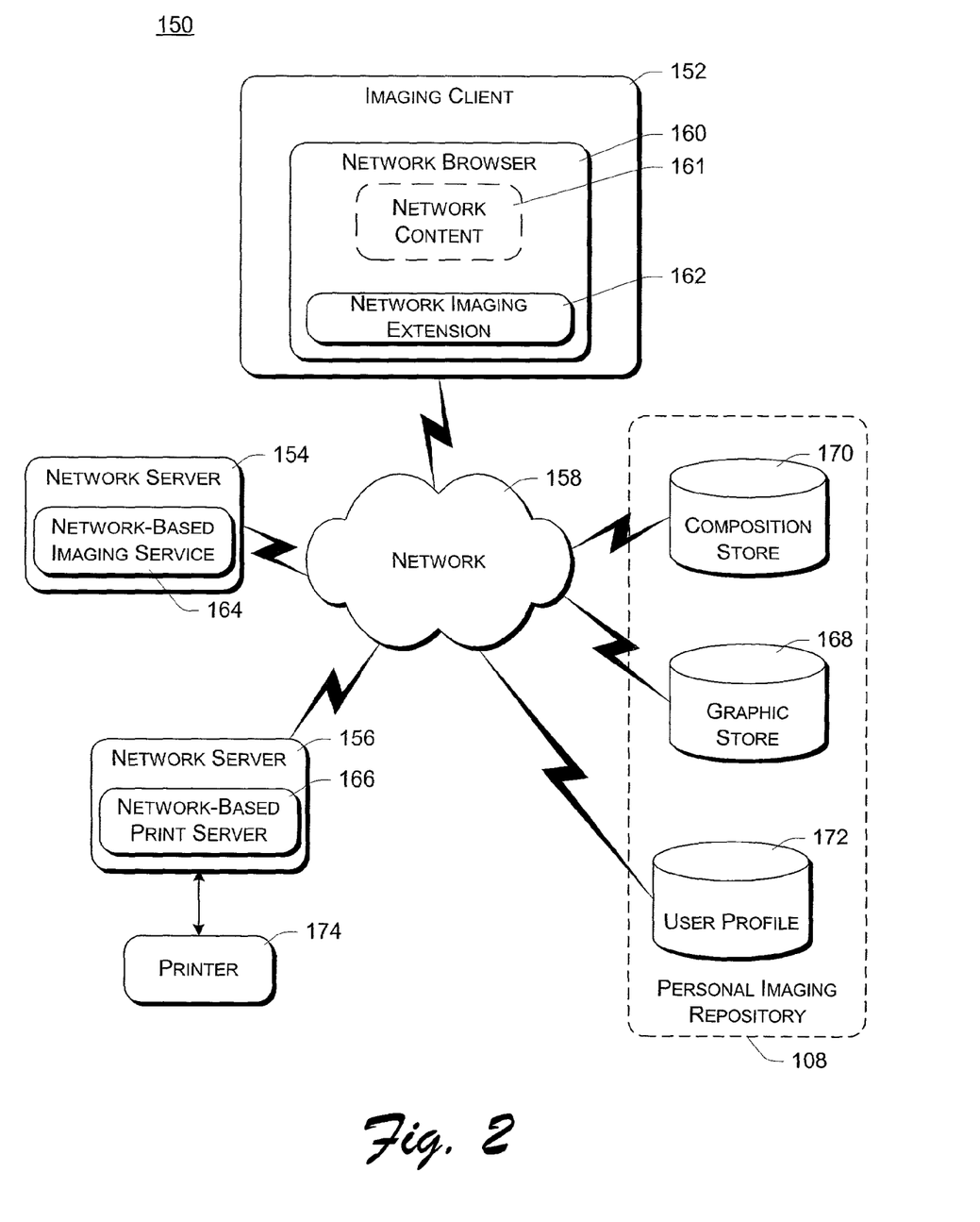
FIG. 2 illustrates an exemplary distributed system illustrating the use of pre-defined print option configurations in a distributed environment in additional detail.

FIG. 2 shows an exemplary distributed system 150 in a distributed environment in additional detail. System 150 includes an imaging client 152 coupled to multiple network servers 154 and 156 via a network 158. Client 152 and servers 154 and 156 represent any of a wide variety of conventional wired and/or wireless computing devices, such as desktop computers, portable computers, dedicated server computers, multi-processor computing devices, cellular telephones, personal digital assistants (PDAs), handheld or pen-based computers, gaming consoles, and so forth.

Network 158 represents one or more conventional data distribution networks that can be used to communicate data and other information (e.g., control information) between or among various computing devices. Examples of network 158 include the Internet, a local area network (LAN), a public or private wide area network (WAN), combinations thereof, and so on. Network 158 can include multiple different types of networks, including wired and/or wireless portions, employing any of a wide variety of different communications protocols, including public and/or proprietary communications protocols.

During operation, a network browser 160 executing on imaging client 152 allows a user of client 152 to interact with network servers 154 and 156, as well as network services executing on such servers. Network browser 160 includes a network imaging extension 162 that allows network content 161 executing in browser 160 to communicate with the user's personal imaging repository 108, which may include communication with services via network 158. As used herein, services refer to software components that can execute on one or more computing devices and are accessible to provide functionality to imaging client 152, such as imaging sources, imaging destinations, printer configuration components, and so forth. Network imaging extension 162 can be implemented in any of a wide variety of manners, such as an application programming interface (API) providing methods that can be called by content 161 and used to interact with servers 154 and 156 (e.g., to load, save, modify, delete, etc. documents).

Network server 154 executes a network-based imaging service 164 that allows a user of browser 160 to interact with his or her personal imaging repository (e.g., add, remove, and/or modify graphics in the repository) and identify an image for printing. Images identified or selected for including in the user's personal imaging repository can be indicated by value (e.g., the actual image data) or by reference (e.g., a pointer to or identifier of the image stored elsewhere). The image to be printed can be made up of graphics from one or more different graphic sources, and include any type of printable data (e.g., text, graphics, and so forth).

Network-based imaging service 164 represents one or more services accessible to imaging client 152. Each service can execute on the same server or alternatively on multiple different servers. These different services can provide different functionality (e.g., one service may be responsible for graphic storage and retrieval functionality, while another service is responsible for merge functionality allowing graphics to be merged together). Additionally, some services may be fully or partially overlapping in functionality provided by other services, allowing a degree of fault-tolerance to be built into system 150 (e.g., one service can take over the responsibilities of another if the other fails).

The graphic for an image is received from a graphic store 168 and/or a composition store 170. Graphic store 168 stores individual graphics (also referred to as documents or more generally data capable of being represented as a two dimensional graphic), such as individual files. These individual graphics in store 168 can be used as individual printable images via imaging service 164. Each individual graphic can be any of one or more types of printable data (e.g., text, pictures, etc.), and may result in multiple hard copy pages when printed. Additionally, a user of browser 160 may identify multiple individual graphics from graphic store 168 that are to be compiled together as a single image for printing. In this situation, network-based imaging service 164 provides an interface that allows the user of browser 160 to select different individual images and store the compilation of individual images as a single composition document (also referred to as a composition image) in composition store 170. The composition document may include the actual data from the individual images, or alternatively identifiers (e.g., file name and path, or Uniform Resource Locators (URLs)) of where the individual images can be retrieved for printing or displaying to the user.

Graphic store 168 and composition store 170 are illustrated in system 150 as two separate stores. Alternatively, multiple such stores may exist in system 150, and one or more graphic stores may be combined with one or more composition stores. Additionally, one or more of these stores 168 or 170 may be implemented on one of servers 154 or 156, and/or imaging client 152.

Network-based imaging service 164 also provides an interface via which a user of browser 160 can access imaging data in the form of documents, pages of documents, and portions thereof, and manipulate and arrange them into a composition document or page.

In order to print an image, the user identifies the image (optionally selecting graphics that are to be part of the image). A print request, including the image data is then communicated to network-based print server 166 executing on network server 156. Upon receipt of the print request, network-based printer server 166 interacts with a printer 174 coupled thereto to produce a hard copy of the image in accordance with the received image data.

Exemplary Web-Based Architecture

Figure 3:
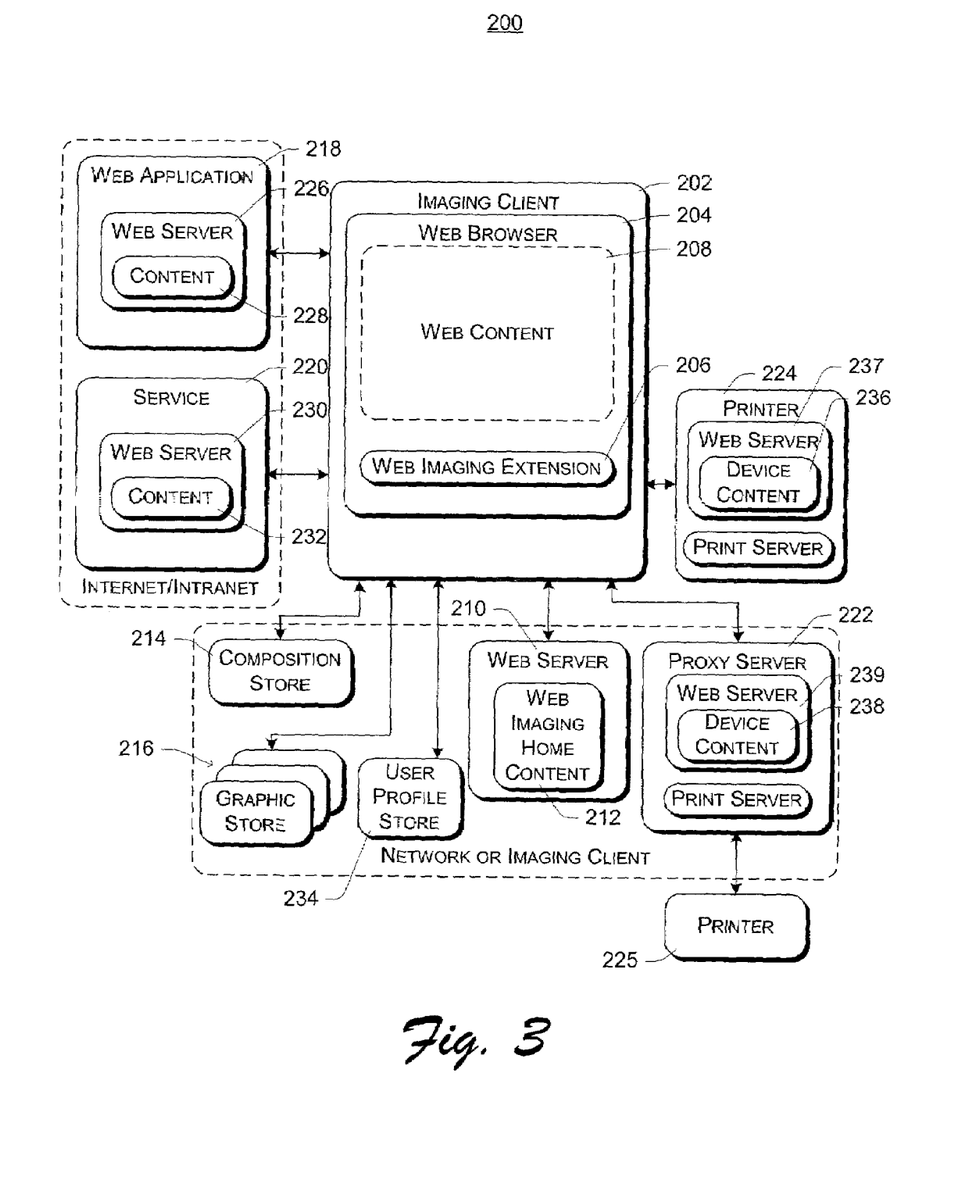
FIG. 3 illustrates an exemplary Web-based architecture in which predefined printer configurations can be used.

FIG. 3 illustrates an exemplary Web-based architecture 200 That is suitable for use in implementing the various described embodiments. Web-based architecture 200 refers to the World Wide Web (or simply the Web), which is a distributed collection of interlinked, user-viewable documents (typically referred to as Web documents or Web pages) that are accessible via the Internet. The Web also refers to the client and server components which provide user access to such documents using standardized Internet protocols. Currently, the primary standard protocol for allowing applications to locate and acquire Web documents is the HyperText Transport Protocol (HTTP), and the Web pages are encoded using a standard markup language such as the HyperText Markup Language (HTML) or eXtensible Markup Language (XML). Alternatively, other protocols or languages may be used.

In architecture 200, an imaging client 202 (i.e., similar to imaging client 152 of FIG. 2) includes a Web browser 204 including a web imaging extension 206. Browser 204 is able to load and execute web content 208 (e.g., Java scripts or programs) from various sources. In the illustrated example, Web browser 204 establishes a communication channel or connection with Web server 210, causing Web imaging home content 212 to be copied to imaging client 202 as at least part of Web content 208. Although illustrated as being copied from Web server 210, it is to be appreciated that Web imaging home content 212 could alternatively be loaded from a local or intermediary source, such as a cache (not shown) implemented on imaging client 202. Additionally, any inputs by the user to Web content 208 are typically handled by Web content 208 rather than being returned to Web imaging home content 212.

Once loaded in Web browser 204, Web content 208 can communicate, via Web imaging extension 206, with other components in architecture 200, allowing access to a personal imaging repository. In the illustrated example, the personal imaging repository includes composition store 214 and graphic store 216, the imaging sources include Web application 218 and service 220, and the imaging destinations include proxy server 222 and printer 224.

Web application 218 includes a Web server 226 that maintains (or obtains/creates) content 228 accessible to Web content 208. Similarly, service 220 maintains a Web server 230 that maintains (or obtains/creates) content 232 accessible to Web content 208. The content 228 and 232, when generated (e.g., from a file or dynamically) and executed on imaging client 202 (e.g., as part of Web content 208), can make various functionality available to Web content 208, such as image sources, combine multiple graphics into a composition document, manipulate imaging data such as logical pages, graphics and text, as will become more apparent below.

Printer 224 and proxy server 222 each optionally include a print server for queuing and managing received print requests, and a Web server 237 and 239 storing or dynamically generating device content 236 and 238, respectively. Device content 236 represents content (which may be generated dynamically) that is provided to the Web browser 204 by the Web server 237. Device content 236 is a Web service available to imaging client 202 that represents printer 224 and that can access the user's personal imaging repository. The device content 236, when downloaded and executed on client 202 (e.g., as part of Web content 208), can access the stores 214 and 216 via Web imaging extension 206 to obtain graphics and upload the graphics to printer 224 for printing. The upload to printer 224 is accomplished using existing conventional mechanisms (e.g., HTTP POSTs or TCP/IP sockets) that allow content executing within the browser to communicate with the server from which that content came. In the illustrated example, imaging extension 206 is only used to obtain graphics from the personal imaging repository, not to upload the graphics to the printer.

Proxy server 222 allows a printer(s) that does not host a Web server to be represented by a Web service. Proxy server 222 includes device content 238 and Web server 239, which operate analogous to device content 236 and Web server 237, respectively. The printer 225 is represented by device content 238 and graphics obtained by the device content 238 (presented in the context of the device). This device content, when downloaded and executed on client 202 (e.g., as part of Web content 208), can upload graphics accessed through the imaging extension to proxy server 222, which in turn forwards these graphics to printer 225.

Web application 218 and service 220 may each be accessible by imaging client 202 via the Internet or via a local network (e.g., an Intranet). Each of the stores 214 and 216, as well as user profile store 234, Web server 210, and proxy server 222, may be accessible via a network (e.g., an Intranet or the Internet) and/or located on imaging client 202.

During operation, Web content 208 generates and renders, via Web browser 204, one or more user interfaces (e.g., graphical user interfaces (GUIs)) that allows the user to interact with his or her personal imaging repository. This interaction includes allowing the user to select images or documents for printing, to identify pre-defined printer configurations to be used in printing selected documents, to select imaging data and manipulate or otherwise arrange the imaging data for printing. Example user interfaces rendered by Web content 208 are discussed below with reference to FIGS. 4–9. The various interfaces can be separate Web pages, or alternatively portions of another (or the same) Web page.

Exemplary UIs

Figure 4:
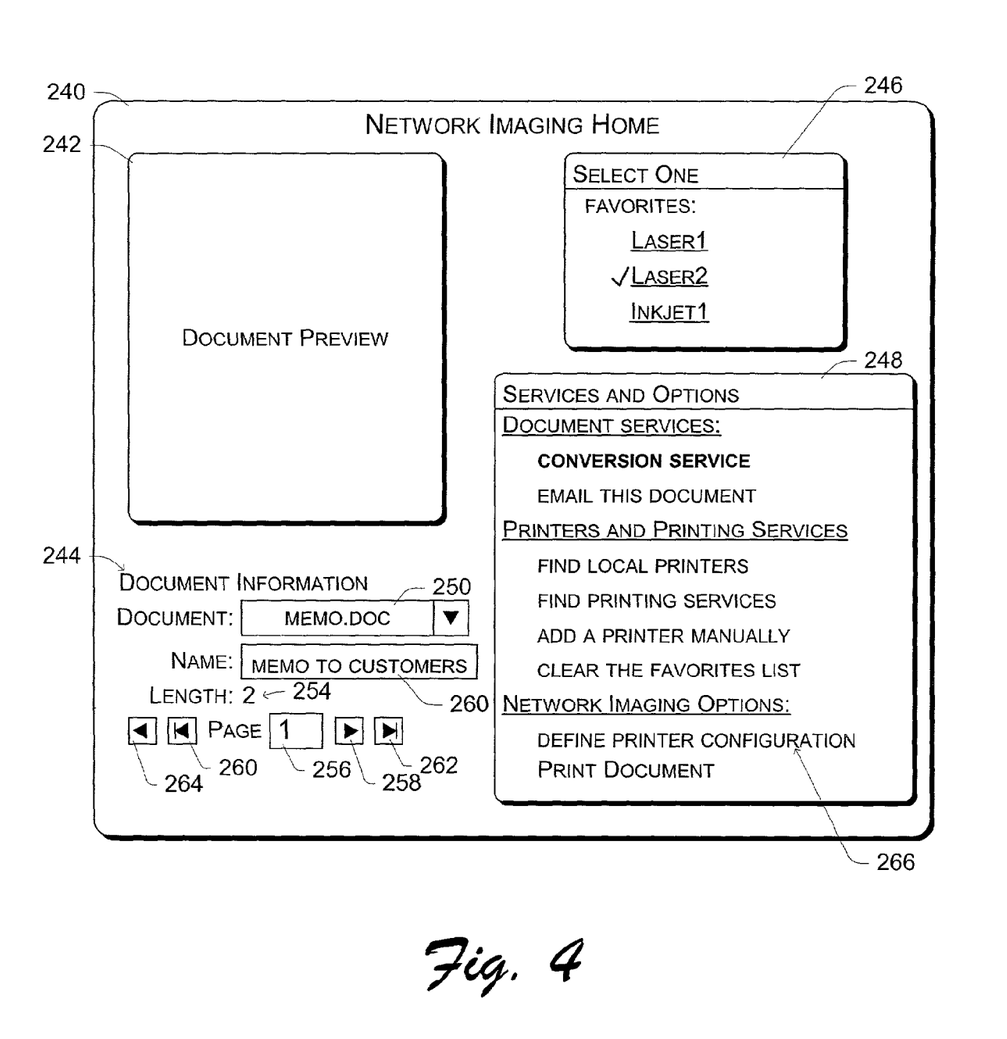
FIG. 4 illustrates an exemplary user interface presented by a Web browser.

FIG. 4 illustrates an exemplary user interface presented by Web browser 204 of FIG. 3. In the illustrated example, user interface 240 is displayed by Web browser 204 as a result of loading the Web imaging home content 212. User interface 240 includes a document preview window 242, a document information portion 244, a favorite printers portion 246, and a services and options portion 248. User interface 240 allows the user to select one or more documents for printing via document information portion 244. The user can select the desired document by name via a pull down menu input 250 or change the name of the selected document in name field 260. Alternatively, other document-selection input mechanisms may be supported, such as cutting and pasting of the document name, dragging and dropping an icon representing the document, supporting a "browse" feature allowing the user to search his or her personal imaging repository (or elsewhere) for documents, and so forth.

The length of the user-selected document (e.g., in pages) is illustrated in a length field 254. Document preview window 242 provides a location via which a small preview image of the document selected for printing (or other processing) is displayed to the user. The document preview window 242 can also be used to arbitrarily arrange or otherwise manipulate imaging data, as will be described in more detail below. A current page section 256 identifies the current page(s) being displayed in document preview window 242, and page manipulation buttons 258, 260, 262, and 264 allow the user to easily advance to the next page in the document, the previous page in the document, the last page of the document, or the first page of the document, respectively.

Favorite printers portion 246 identifies one or more printers that are selectable by the user for printing, and can include, for example, the user's preferred printers, suggested printers to be used by the user, default printers, and so forth. In the illustrated example, each printer identified in favorites portion 246 is identified by a hyperlink (illustrated as being underlined). The user can select one of the printers that the identified document is to be printed on by activating the hyperlink (e.g., by using a pointer control device to situate a pointer over the hyperlink on screen and click a button of the control device).

Services and options portion 248 allows the user to identify or request options or services, such as to add a printer to favorites portion 246, clear favorites portion 246, print the document, and so forth.

One of the services available for selection on the services and options portion 248 is a "conversion service" portion. In this embodiment, a user can select this option so that they can have one or more documents printed without any grayscale or color values other than those that correspond to pure black and pure white.

Figure 5:
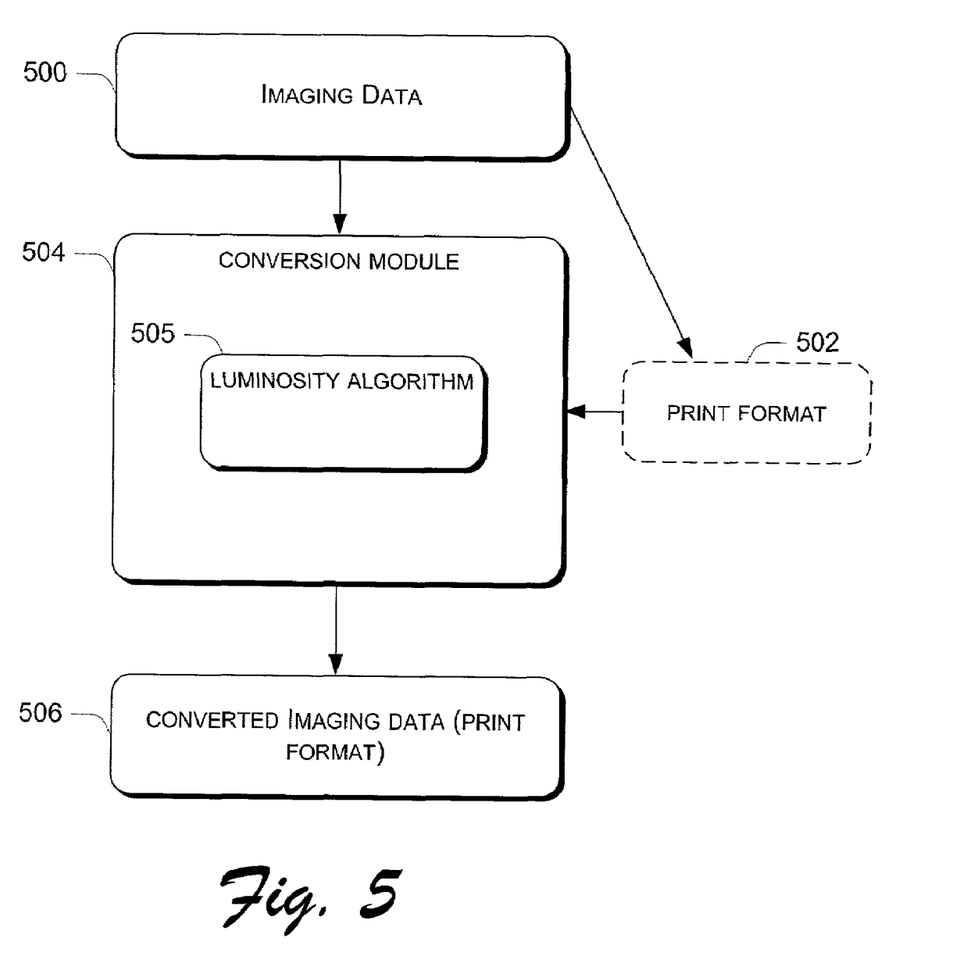
FIG. 5 is a block diagram that provides an overview of a document conversion process in accordance with one embodiment.

FIG. 5 is a block diagram that conceptually illustrates one way in which imaging data which would result in printed grayscale or color images can be processed to ensure that the printed image corresponding to the imaging data is free of any grayscale or color images other than, of course, those that correspond to pure black and pure white.

In this example, imaging data 500 is provided. This imaging data can typically comprise the imaging data that is resident in a user's personal imaging repository or in some other location, such as a network- or Web-accessible location. The imaging data can be processed by a conversion module 504 that converts imaging data that would result in printed grayscale or color values other than pure black or pure white, into imaging data that results in only pure black or white appearing on a printed page. The conversion module can have one or more luminosity algorithms 505 that are used to process the imaging data. The luminosity algorithms can process the imaging data to ensure that data corresponding to certain luminosity values associated with grayscale or color are modified such that only pure black or pure white appears on a printed page.

In one implementation, the imaging data can be converted into a print format 502. The print format 502 is a format that is understood by a printer that is to print the imaging data. Many different print formats are possible. As an example, print formats can comprise various page description languages such as PCL, Postscript and the like. In one embodiment, this conversion module comprises part of a network-based or Web-based service. Specifically, conversion module 504 can comprise part of content 228 of Web application 218, content 232 of service 220, content 212 of Web server 210, device content 238 of proxy server 222, device content 236 of printer 224, or Web content 208 of Web browser 204. The conversion module 504 includes one or more luminosity algorithms 505 that process the print format to ensure that when a document is printed that represents the imaging data 500, if the imaging data contains any data other than that which would be rendered in black and white, such data is indeed rendered as either black or white with no grayscale or color values in between. As a result of the processing that takes place in the conversion module 504, converted imaging data 506 (or, optionally converted print format 506) is produced. The data can then be further processed and printed by a printer to provide a printed document having only black and white components.

It is to be appreciated that as imaging formats can vary, so too can the parameters that are processed by the conversion module 504 and, more specifically, by luminosity algorithm 505. As but one example of an imaging format and the processing that can take place, consider the following. In PostScript, one can redefine the "setgray" and "setcolor" operators such that they set the color parameter in the graphics state to either black or white based on the color component operands supplied to the two operators. For instance, the "setgray" operator takes one operand that specifies the level of gray to be used. The redefined "setgray" operator can set the color parameter to black if the "setgray" operand is less than 0.5, and can set the color parameter to white if the operand is greater than or equal to 0.5. Other variations are, of course, possible.

Exemplary Methods

Figure 6:
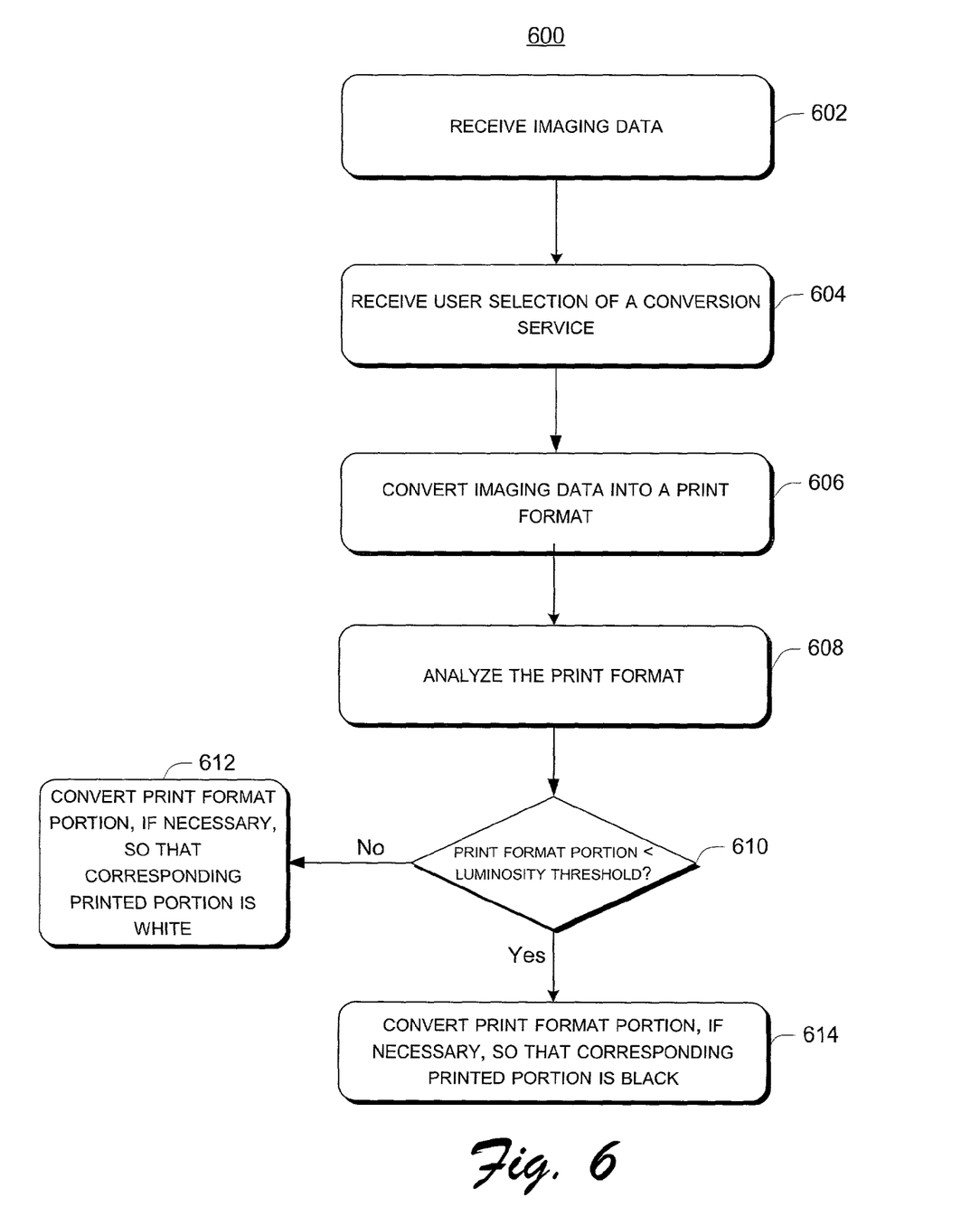
FIG. 6 is a flow diagram that describes steps in a method in accordance with one embodiment.

FIG. 6 is a flow diagram illustrating steps in a document conversion method 600 in accordance with one embodiment. The method can be implemented in any suitable hardware, software, firmware, or combination thereof. In one embodiment, the method is implemented by a network-based or Web-based service.

Step 602 receives imaging data. This step can be implemented, at least in part, by enabling a user to access imaging data in their personal imaging repository or any other suitable location. The imaging data can be received, for example, by an imaging client for analysis and conversion by the imaging client. Alternately, the imaging data can be received by a network-based or Web-based service for analysis and conversion. Alternately, different steps described above and below can be performed in a distributed fashion. For example, an imaging client may receive the imaging data, while analysis and conversion takes place at a service-enabled printer. Alternately, a Web-based service might access the user's imaging data and process the data so that a service-enabled printer can perform the analysis and conversion functions.

Step 604 receives a user selection of a conversion service. The conversion service permits a user to print a document in black and white, with no grayscale or color values. This step can be implemented by providing the user with a suitable interface so that they can indicate their selection. FIG. 4 shows but one exemplary user interface that can accomplish this task.

The imaging data is then processed to ensure that if the imaging data contains any data that would result in a printed document having any grayscale or color values other than pure black or pure white, such imaging data is modified so that only pure black or pure white appear on a printed document. Steps 606–614 constitute but one way of implementing a processing technique that looks specifically at imaging data in a print format. It is to be understood that the imaging data itself can be processed, rather than the print format.

Accordingly, in this specific embodiment, step 606 converts the imaging data into a print format. Examples of print formats are given above. This step can be implemented in response to a user indicating, via a presented user interface, that they wish to print a particular document. Step 608 analyzes the print format with an analysis that is directed to ensuring that the print format results in a printed document that contains only black and white portions, and no grayscale representations. In but one embodiment, such analysis can include, at step 610, ascertaining whether portions of the print format are associated with values that are less than a predetermined luminosity threshold. This step can be implemented in different ways depending on the specific print format used. Generally, however, this step is implemented by considering and evaluating parameters of the print format that are directed to providing a grayscale representation. One specific example in the context of Postscript was given above. If step 610 determines that the print format portion is not less than a certain luminosity threshold, then step 612 converts the print format portion, if necessary, so that corresponding printed portions are white. If, on the other hand, step 610 determines that the print format portion is less than the luminosity threshold, then step 614 converts the print format portion, if necessary, so that the corresponding printed portions are black. In some instances, such as when the analyzed print format portion contains a value that corresponds to black or white, it will be unnecessary to convert the print format portion.

Figure 7:
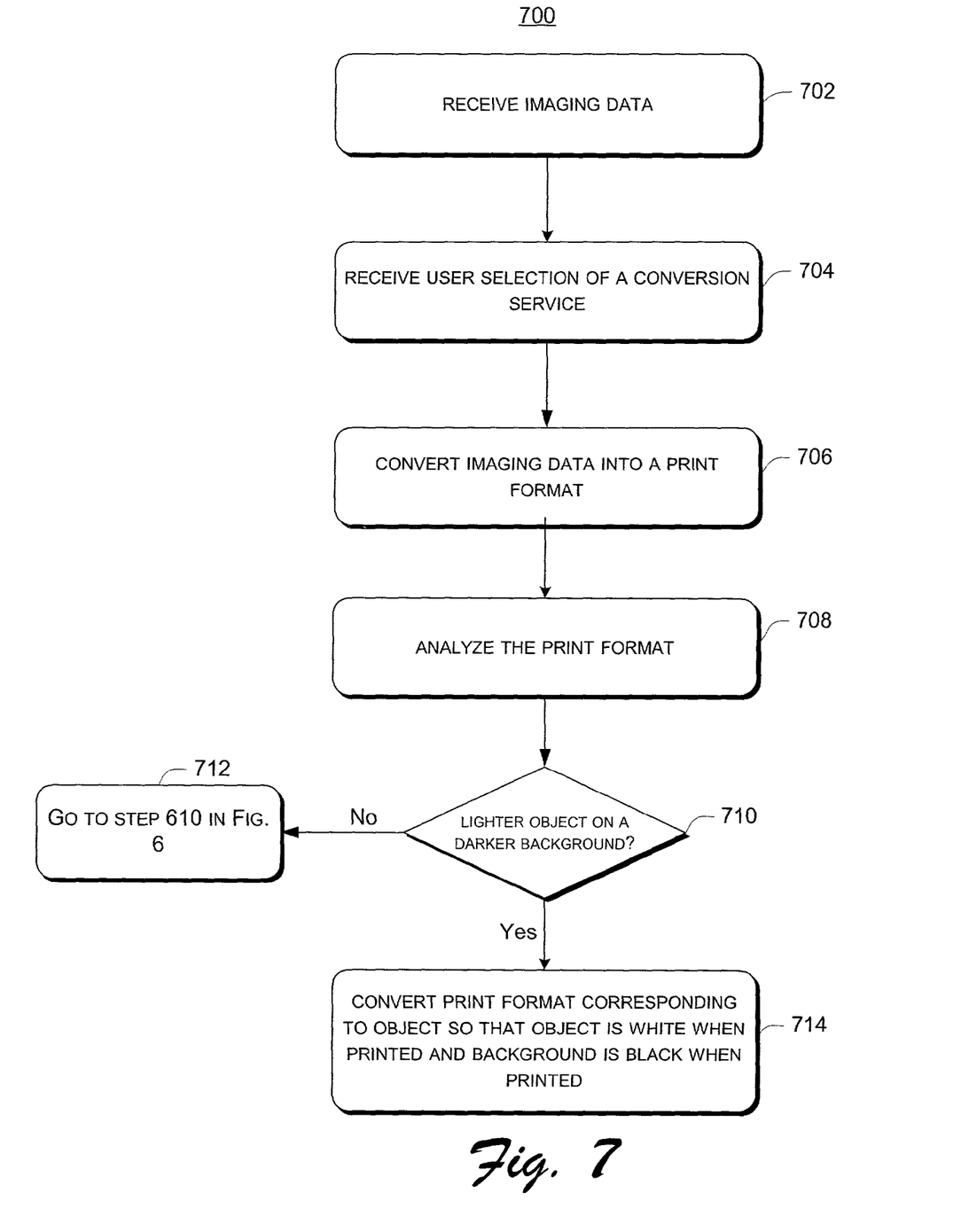
FIG. 7 is a flow diagram that describes steps in a method in accordance with one embodiment.

FIG. 7 is a flow diagram illustrating steps in a document conversion method 600 in accordance with one embodiment. The method can be implemented in any suitable hardware, software, firmware, or combination thereof. In one embodiment, the method is implemented by a network-based or Web-based service.

Step 702 receives imaging data. This step can be implemented, at least in part, by enabling a user to access imaging data in their personal imaging repository. The imaging data can be received, for example, by an imaging client for analysis and conversion by the imaging client. Alternately, the imaging data can be received by a network-based or Web-based service for analysis and conversion. Alternately, different steps described above and below can be performed in a distributed fashion. For example, an imaging client may receive the imaging data, while analysis and conversion takes place at a service-enabled printer. Alternately, a Web-based service might access the user's imaging data and process the data so that a service-enabled printer can perform the analysis and conversion functions.

Step 704 receives a user selection of a conversion service. The conversion service permits a user to print a document in black and white, with no grayscale values. This step can be implemented by providing the user with a suitable interface so that they can indicate their selection. FIG. 4 shows but one exemplary user interface that can accomplish this task. The imaging data is then processed to ensure that if the imaging data contains any data that would result in a printed document having any grayscale or color values other than pure black or pure white, such imaging data is modified so that only pure black or pure white appear on a printed document. Steps 706–714 constitute but one way of implementing a processing technique that looks specifically at imaging data in a print format. It is to be understood that the imaging data itself can be processed, rather than the print format.

Step 706 then converts the imaging data into a print format. Examples of print formats are given above. This step can be implemented in response to a user indicating, via a presented user interface, that they wish to print a particular document. Step 708 analyzes the print format with an analysis that is directed to ensuring that the print format results in a printed document that contains only black and white portions, and no grayscale representations. In but one embodiment, such analysis can include, at step 710, ascertaining whether a print format portion corresponds to a lighter object on a darker background. If the print format portion does not correspond to a lighter object appearing on a darker background, then the method branches, at step 712, to step 610 of FIG. 6 and proceeds as described therein. If, on the other hand, the print format portion corresponds to a lighter object on a darker background, then step 714 converts the print format corresponding to the object so that the object is white when printed. In addition, this step converts the print format portion corresponding to the background so that the background is black when printed. This can be done independent of any set luminosity thresholds and ensures that background and foreground objects are presented together in a manner that can be perceived by the user.

In each of FIGS. 6 and 7, it will be appreciated that following steps 612 or 614 (for FIG. 6), and step 714 (for FIG. 7), the converted print format can either be printed, or it can be saved in the user's personal imaging repository as a new active composition document.

Various acts are illustrated in the processes of FIGS. 6 and 7 above. However, no particular required order is to be associated with the acts based on their order of presentation in FIGS. 6 and 7. The acts may be performed in different orders than they are presented in FIGS. 6 and 7, and multiple acts may be performed concurrently (or partly concurrently).

Exemplary Printing Process

Returning to FIG. 3, the process of printing a document in system 200 can be seen from the following example. Via the interface provided by Web browser 204 and content 208, the user is able to access images from different imaging sources, such as Web application 218, service 220, graphic store 216, or composition store 214. Additionally, as described above, the user is able, through the provided user interfaces, to select a conversion service in which any printed documents will be printed in black and white with no grayscale representations. The user can also select, if provided, one of a variety of predefined printer configurations stored in user profile store 234. Exemplary printer configurations are described in the U.S. patent application incorporated by reference above. In accordance with this incorporated disclosure, the user can select a printer on which to print the selected document, such as printer 225 coupled to proxy server 222, or printer 224. When the user selects the print option, an identification of the document (as well as an identification that indicates the conversion service has been selected) can be communicated to the appropriate printer. Upon receipt of the print request, the printer can, in one embodiment, process imaging data corresponding to the identified document as described above, and can print the requested document, applying all of the requested print options in the configuration that it supports (e.g., functions that the printer offers (such as stapling) and that the printer is equipped to perform (such as being loaded with staples)).

The print request communicated to the printer can, but need not include an identifier of the document that is to be printed. Any of a wide variety of identifiers can be used, such as a Uniform Resource Locator (URL). This may be an identifier of a single document (e.g., a document in graphic store 216), or an identifier of a composition document (e.g., a document in composition store 214) that itself includes identifiers of one or more other documents or pages from other documents. Alternatively, the data of the document to be printed may be communicated to the printer from the client 202, such as by the device content 236 of FIG. 3 (when downloaded and executed on the client 202). The data of the document may be communicated with the print request, or alternatively subsequent to the print request.

If the user has selected the conversion service for converting imaging data to either black or white, then this choice can be articulated to the printer. Articulation can take place in any number of ways. For example, the fact that the user has selected the conversion service can be articulated to the printer along with the document's identifier (e.g. as part of a URL string). It is to be appreciated that various embodiments can vary a) where the conversion service is selected and configured (which can be in the same place as the conversion service or external to the conversion service), b) whether or not the conversion service is integrated into the destination, and, c) how the document reference gets conveyed to the destination print service (which can be by, among other ways, embedding a URL to the document into a redirection URL to the conversion service, by using "client side" identity technology (such as that implied by the personal imaging repository, or by using "server side" identity technology)). In a preferred implementation, the conversion service is configured within the conversion service, is integrated into the destination, and is conveyed using an "identity" mechanism (e.g. personal imaging repository).

Some Server Side Issues

Although the inventive embodiments have been described largely in the context of the client side environment, it is to be appreciated and understood that various aspects of the described embodiments can be implemented on the server side. As an example, consider the following. The above-described imaging extension is used to make user information available to content downloaded into the user's browser. In other words, the imaging extension makes information associated with the user's identity available. Thus, one purpose of the imaging extension is to provide access to the user's personal imaging repository.

As was mentioned, this can be accomplished through the imaging extension which extends the behavior of the browser. Although there are advantages to this approach, there are also disadvantages—namely, the browser must somehow be extended. Although it is possible to extend browsers on Windows operating systems, it becomes harder to do this for newer devices like PDAs. Consequently, it is desirable to support the notion of identity without requiring the browser to be extended.

Supporting identity without requiring the browser to be extended can be accomplished by moving the logic normally present in the web content running within the browser into the web server. That is, rather than the web content accessing the user's personal imaging repository, the web server accesses the user's personal imaging repository. In other words, the identity technology is on the server side instead of client side.

One of the problems that arises in this context pertains to the server being able to determine the location of the user's personal imaging repository (more specifically, the user profile which can act as the root of the personal imaging repository). In the client side identity approach, the imaging extension running within the browser implicitly addressed this issue. The content, by virtue of the fact that it is running within the user's browser and accessing the imaging extension, "knows" the identity of the user. For the server, a different approach can be employed since the browser no longer typically provides any sort of hint regarding the user's identity. One approach to solving this problem is to use an authentication website. The website in question can redirect to the authentication website which then determines the identity of the user, and then redirects back to the user with the user identity, including the location of the user's profile. In this scheme, it is assumed that all websites "know" about the authentication server.

Once the user's identity is determined (i.e. the location of the user's profile is known) the website can directly interact with services in the user's personal imaging repository without the aid of the imaging extension. It is also possible to add security to this model. Such could be done using known techniques.

Exemplary Computer System

Figure 8:
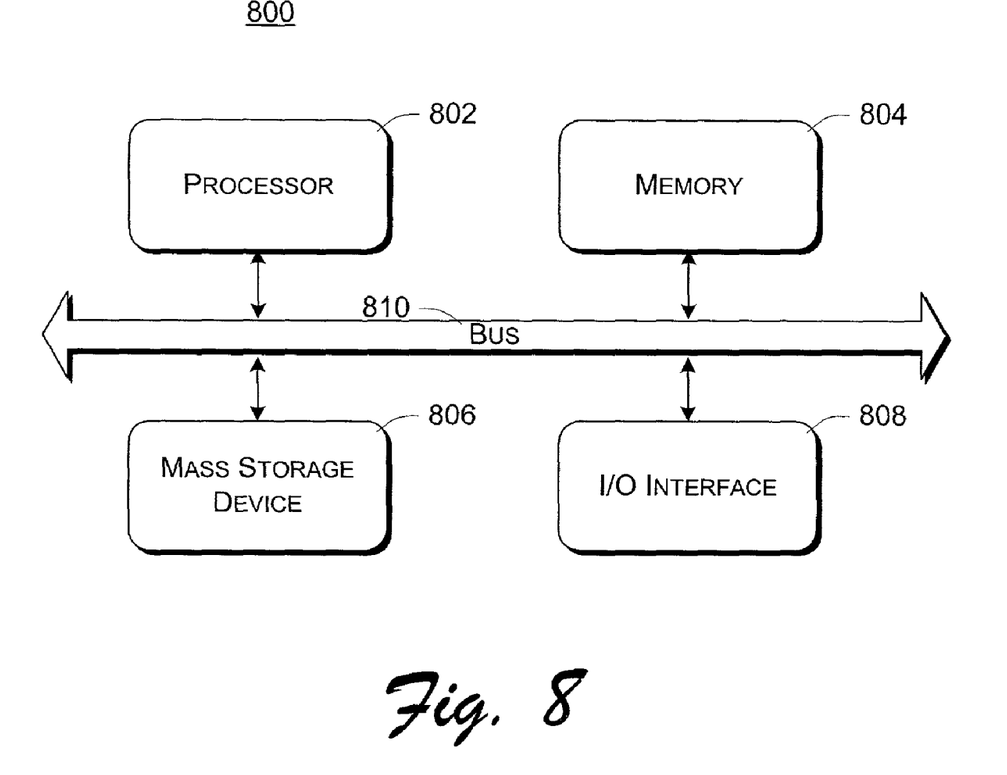
FIG. 8 illustrates an exemplary computer system in additional detail.

FIG. 8 illustrates an exemplary computer system 800 in additional detail. Computer system 800 can be, for example, a network client 102 of FIG. 1, an imaging client 152 or server 154 or 156 of FIG. 2, an imaging client 202, server 210 or 222 of FIG. 3, etc. Computer system 800 represents a wide variety of computing devices, such as desktop computers, portable computers, dedicated server computers, multi-processor computing devices, cellular telephones, personal digital assistants (PDAs), handheld or pen-based computers, microcontroller-based electronic devices, gaming consoles, and so forth.

Computer system 800 includes one or more processors 802, memory 804, a mass storage device 806, and an input/output (I/O) interface 808, all coupled to a bus 810. Bus 810 represents one or more buses in computer system 800, such as a system bus, processor bus, accelerated graphics port (AGP), peripheral component interconnect (PCI), and so forth. The bus architecture can vary by computing device as well as by manufacturer. I/O interface 808 is a conventional interface allowing components of system 800 (e.g., processor(s) 802) to communicate with other computing devices via a network, such as network 158 of FIG. 2. I/O interface 808 may be, for example, a modem, a network interface card (NIC), and so forth.

Memory 804 represents volatile and/or nonvolatile memory used to store instructions and data for use by processor 802. Typically, instructions are stored on a mass storage device 806 (or nonvolatile memory) and loaded into a volatile memory 804 for execution by processor(s) 802. Additional memory components may also be involved, such as cache memories internal or external to processor 802. Various embodiments can be implemented, at different times, in any of a variety of computer readable media that is part of, or readable by, system 800. For example, such computer readable media may be mass storage device 806, memory 804 or a cache memory, a removable disk (not shown) that is accessible by processor 802 or another controller of system 800 (such as a magnet disk or optical disk), and so forth.

Computer system 800 is exemplary only. It is to be appreciated that additional components (not shown) can be included in system 800 and some components illustrated in system 800 need not be included. For example, a display adapter, additional processors or storage devices, additional I/O interfaces, and so forth may be included in system 800, or mass storage device 806 may not be included.

I/O interface 808 is a conventional interface allowing components of system 800 (e.g., processor 802) to communicate with other computing devices via a network, such as network 158 of FIG. 2.

The discussions herein refer primarily to software components and modules that can be executed by a computing device. It is to be appreciated, however, that the components and processes described herein can be implemented in software, firmware, hardware, or a combination thereof. By way of example, a programmable logic device (PLD) or application specific integrated circuit (ASIC) could be configured or designed to implement various components and/or processes discussed herein.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   selecting imaging data from a personal imaging repository;
   receiving, via at least one network service, user input selecting a conversion service; and
   using the conversion service, processing a print format corresponding to said imaging data so that any grayscale or color values other than those that correspond to pure white and pure black are eliminated.

2. The method of claim 1, wherein said selecting comprises:
   presenting, via said at least one network service, a user interface on a client device, the user interface enabling a user to select imaging data from the personal imaging repository; and
   receiving, via said at least one network service, a user selection of imaging data from the personal imaging repository.

3. The method of claim 1 further comprising printing a document corresponding to said imaging data via said at least one network service, said printing providing one or more printed pages having only pure black and pure white portions.

4. The method of claim 1, wherein said act of processing the print format is performed on a client device.

5. The method of claim 1, wherein said act of processing the print format is performed by said at least one network service.

6. The method of claim 1 further comprising:
processing the imaging data to provide the print format; and
processing the print format using the conversion service so that any grayscale or color values other than those that correspond to pure white and pure black are eliminated.

7. The method of claim 1, wherein said acts of selecting and receiving user input are performed by multiple network services.

8. The method of claim 1, wherein said at least one network service is implemented, at least in part, by at least one printer.

9. The method of claim 1, wherein said at least one network service is implemented, at least in part, by at least one proxy server that serves as a proxy for at least one printer.

10. A method comprising:
presenting, via at least one network service, a user interface on a client device, the user interface enabling a user to select imaging data that is to be printed;
receiving, via said at least one network service, a user selection of imaging data; and
processing the imaging data, via said at least one network service, so that grayscale or color other than pure white and pure black are eliminated.

11. The method of claim 10 further comprising printing a document corresponding to said imaging data via said at least one network service, said printing providing one or more printed pages having only pure black and pure white portions.

12. One or more computer-readable media having stored thereon computer-readable instructions which, when executed by one or more processors, cause the processors to:
send content to a client device, said content enabling the client device to:
display a user interface to enable a user to select imaging data from a network-accessible personal imaging repository;
provide, over a network, a user selection of imaging data from the personal imaging repository; and
provide, over the network, user input selecting a conversion service that is configured to process a print format corresponding to said imaging data so that any grayscale or color values other than those that correspond to pure white and pure black are eliminated.

13. One or more computer-readable media as recited in claim 12, wherein the instructions further cause the one or more processors to print, via the network, a document corresponding to said imaging data.

14. One or more computer-readable media as recited in claim 12, wherein the instructions further cause the one or more processors to process the print format corresponding to said imaging data so that any grayscale or color values other than those that correspond to pure white and pure black are eliminated.

15. A method comprising:
presenting, via at least one Web service, a user interface on a client device, the user interface enabling a user to select imaging data from a Web-accessible location;
receiving, via said at least one Web service, a user selection of imaging data from the Web-accessible location;
receiving, via said at least one Web service, user input selecting a conversion service; and
processing said imaging data using the conversion service so that one or more grayscale or color values other than those that correspond to pure white and pure black, if present, are eliminated.

16. The method of claim 15, further comprising printing a document corresponding to said imaging data via said at least one Web service.

17. The method of claim 15, wherein said act of processing is performed on a client device.

18. The method of claim 15, wherein said act of processing is performed by said at least one Web service.

19. The method of claim 15, wherein said act of processing comprises:
converting the imaging data to a print format; and
processing the print format to eliminate grayscale or color values.

20. The method of claim 15, wherein said at least one Web service is implemented, at least in part, by at least one printer.

21. A method comprising:
presenting, via at least one Web service, a user interface on a client device, the user interface enabling a user to select imaging data from a personal imaging repository;
receiving, via said at least one Web service, a user selection of imaging data from the personal imaging repository;
processing the imaging data, via said at least one Web services so that grayscale or color other than pure white and pure black are eliminated; and
printing a document corresponding to said imaging data, via said at least one Web service.

22. One or more computer-readable media having stored thereon computer-readable instructions which, when executed by one or more processors, cause the processors to perform a method comprising:
receiving data arranged in a print format for processing by a printer for printing; and
processing the data to ensure that the print format results in a printed document that contains only black and white portions,
wherein said processing comprises ascertaining whether values associated with portions of the print format are less than or greater than a luminosity threshold and, if so, adjusting said values so that the printed document contains only black and white portions.

* * * * *

UNITED STATES PATENT AND TRADEMARK OFFICE
CERTIFICATE OF CORRECTION

| | |
|---|---|
| PATENT NO. | : 7,184,176 B2 |
| APPLICATION NO. | : 09/953760 |
| DATED | : February 27, 2007 |
| INVENTOR(S) | : Shell S. Simpson et al. |

Page 1 of 1

It is certified that error appears in the above-identified patent and that said Letters Patent is hereby corrected as shown below:

In column 14, line 41, in Claim 21, delete "services" and insert -- service, --, therefor.

Signed and Sealed this

Eighteenth Day of August, 2009

David J. Kappos
*Director of the United States Patent and Trademark Office*